(12) United States Patent
Eberlein et al.

(10) Patent No.: US 10,713,375 B2
(45) Date of Patent: Jul. 14, 2020

(54) DATABASE PUBLIC INTERFACE

(71) Applicant: SAP SE, Walldorf (DE)

(72) Inventors: Peter Eberlein, Malsch (DE); Volker Driesen, Heidelberg (DE); Arne Harren, Walldorf (DE)

(73) Assignee: SAP SE, Walldorf (DE)

( * ) Notice: Subject to any disclaimer, the term of this patent is extended or adjusted under 35 U.S.C. 154(b) by 793 days.

(21) Appl. No.: 14/880,009

(22) Filed: Oct. 9, 2015

(65) Prior Publication Data

US 2017/0103226 A1    Apr. 13, 2017

(51) Int. Cl.
*G06F 21/62* (2013.01)
*G06F 16/25* (2019.01)

(52) U.S. Cl.
CPC .......... *G06F 21/6227* (2013.01); *G06F 16/25* (2019.01); *G06F 21/629* (2013.01)

(58) Field of Classification Search
None
See application file for complete search history.

(56) References Cited

U.S. PATENT DOCUMENTS

| | | | |
|---|---|---|---|
| 2004/0243555 A1* | 12/2004 | Bolsius | G06F 17/30471 |
| 2005/0050076 A1* | 3/2005 | Tong | G06F 16/213 |
| 2005/0289174 A1* | 12/2005 | Kolli | G06F 17/30566 |
| 2007/0220013 A1* | 9/2007 | Rabines | G06F 17/30554 |
| 2008/0189758 A1* | 8/2008 | Akeel | G06F 21/6227 726/1 |
| 2012/0227044 A1* | 9/2012 | Arumugham | G06Q 10/06 718/100 |
| 2014/0172788 A1* | 6/2014 | Haase | G06F 16/27 707/610 |
| 2015/0066975 A1* | 3/2015 | Dos Santos | G06F 16/245 707/769 |
| 2015/0199395 A1* | 7/2015 | Greenstein | G06F 17/30292 707/611 |
| 2017/0161511 A1 | 6/2017 | Eberlein et al. | |

OTHER PUBLICATIONS

Oracle, "Oracle Database Administrator's Guide," 2008 (Year: 2008).*
Team ABAP, "Projection View," May 2014 (Year: 2014).*
"U.S. Appl. No. 14/958,284, Non Final Office Action dated Dec. 1, 2017", 18 pgs.
"U.S. Appl. No. 14/958,284, Examiner Interview Summary dated Jan. 19, 2018", 3 pgs.
"U.S. Appl. No. 14/958,284, Notice of Allowance dated Apr. 27, 2018", 7 pgs.
"U.S. Appl. No. 14/958,284, Response filed Feb. 15, 2018 to Non Final Office Action dated Dec. 1, 2017", 18 pgs.

* cited by examiner

*Primary Examiner* — Usmaan Saeed
*Assistant Examiner* — Yu Zhao
(74) *Attorney, Agent, or Firm* — Schwegman Lundberg & Woessner, P.A.

(57) ABSTRACT

Methods, systems, and computer program products for accessing a database element are described. A table link of a persistency interface is defined, the table link being a representation of a table of a persistency schema. A role for the persistency interface is defined, the role defining a type of access for a specified portion of the database element.

20 Claims, 10 Drawing Sheets

Table link = projection view

Restriction
 Table Link should include all primary key columns of underlying table
Syntax
 CREATE PROJECTION VIEW < view_name> [(<column_name_list>)] AS SELECT <field_list> FROM [<schema>.]<table_name>
 DROP VIEW <view_name>
 Syntax Elements
        <view_name> ::= [<schema_name>.]<identifier>
        <schema_name> ::= <identifier>
        <column_name_list> ::= <column_name>[{, <column_name>}...]
        <column_name> ::= <identifier>
 Example
- CREATE TABLE A (A INT PRIMARY KEY, B INT DEFAULT 0, C INT DEFAULT 0)
- CREATE PROJECTION VIEW A_LK (COL_A, COL_B) AS SELECT A, B FROM A
- DROP VIEW A_LK

DATABASE PUBLIC INTERFACE

FIELD

The present disclosure relates generally to a mechanism for accessing data structures. In an example embodiment, the disclosure relates to a mechanism for accessing a database table based on an assigned role.

BACKGROUND

Application integration is an important component of meeting the needs of business applications. The networked solutions concept addresses this challenge by, for example, providing pre-defined and auto-configured integration services for common business scenarios that may be accessible via a network. A number of services (e.g., solutions) may be networked together and provided as an integrated landscape. The landscape may include on-premise software, software as a service, and the like. In addition, micro services may be offered where a software component provides one or more low-level services to another service, an application or user.

An application, including an application that provides a micro-service, may utilize persistency components, such as a table, in a database system. A table is typically dedicated to a particular application. In some instances, an application may need to access a table or other data structure of another application. In this case, the table is typically accessed via the application that owns the table or structure.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing program products that embody example embodiments of the present invention. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures and techniques have not been shown in detail.

Generally, methods, systems, apparatus, and computer program products for a mechanism for accessing a data structure are described. In one example embodiment, a persistency interface is defined and used to access a table and/or view of a database. For example, the table(s) of a persistency (i.e., backing) service residing in one database schema can be exposed to another database schema using table links and/or synonyms, as described more fully below. Views and/or procedures of one application can thereby access data in other schemas of other applications at the database level. It is noted that a persistency interface defined for a view may provide a higher level of decoupling between schemas and their corresponding applications than a persistency interface defined for a table.

The disclosed methods, systems, apparatus, and computer program products may be universally applicable independent of deployment models and client technologies, and may be suited for heterogeneous networked solutions landscapes. In one example embodiment, any number of networked solutions, any type of deployment model (such as on premise and/or in cloud), and any client technology (such as native desktop client, browser interface, mobile application, and the like) may be utilized in a landscape environment.

Figure 1A:
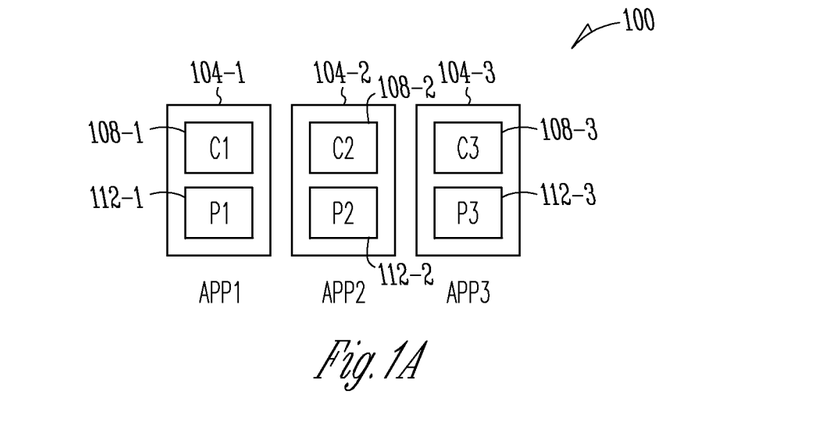
FIG. 1A is a block diagram of an example landscape environment comprising a plurality of applications, in accordance with an example embodiment.

FIG. 1A is a block diagram of an example landscape environment 100 comprising a plurality of applications 104-1 through 104-3 (hereinafter collectively known as applications 104), in accordance with an example embodiment. Each application 104 comprises a corresponding software component 108-1 through 108-3 (hereinafter collectively known as software components 108) and a corresponding persistency (storage) component 112-1 through 112-3 (hereinafter collectively known as persistency components 112). Each application 104 may provide a micro-service and may perform a service on behalf of another entity. In one example embodiment, an application 104 communicates with other entities via hypertext transfer protocol (HTTP). For example, the application 104-2 may use HTTP to access the persistency component 112-1 of the application 104-1 to perform a join operation.

Figure 1B:
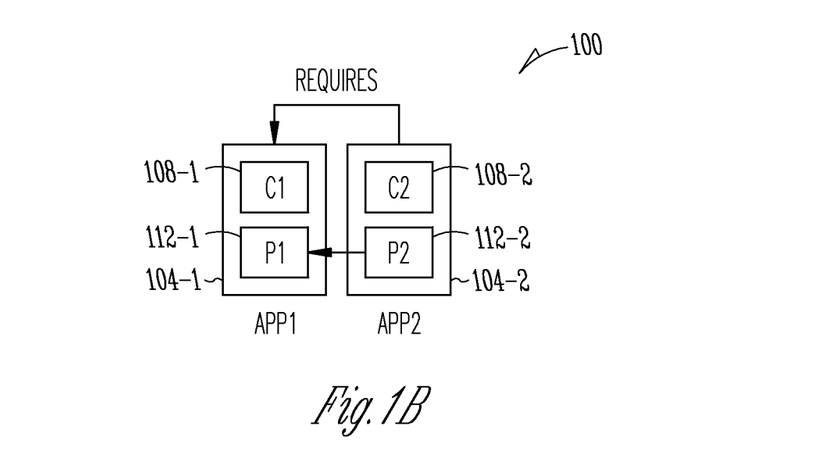
FIG. 1B is a block diagram of an example landscape environment comprising a portion of the applications of FIG. 1A, in accordance with an example embodiment.

FIG. 1B is a block diagram of an example landscape environment comprising a portion of the applications 104-1, 104-2 of FIG. 1A, in accordance with an example embodiment. As illustrated in FIG. 1A, each application 104 comprises a corresponding software component 108 and a corresponding persistency component 112. In the example of FIG. 1B, the application 104-2 requires access to the persistency component 112-1 of the application 104-1, such as access to a table of the application 104-1. As described above, the application 104-2 may use HTTP to access the persistency component 112-1 of the application 104-1 via software component 108-1.

Figure 2A:
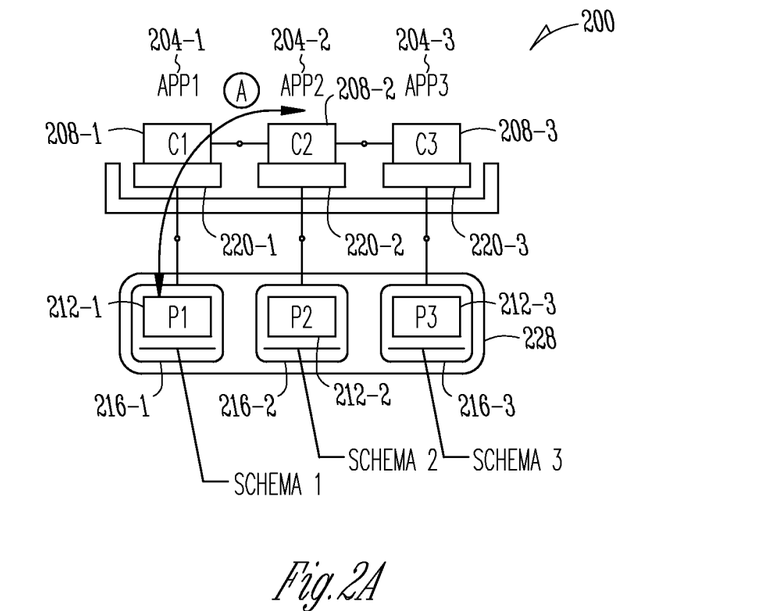
FIG. 2A is a block diagram of an example landscape environment comprising a plurality of applications and a database system, in accordance with an example embodiment.

FIG. 2A is a block diagram of an example landscape environment 200 comprising a plurality of applications 204-1 through 204-3 (hereinafter collectively known as applications 204) and a database system 228, in accordance with an example embodiment. The plurality of applications 204-1 through 204-3 comprise software components 208-1 through 208-3, respectively. The database system 228 implements a portion or all of the persistency components 212-1 through 212-3 (hereinafter collectively known as persistency components 212) of each corresponding application 204 via a corresponding schema 216-1 through 216-3 (hereinafter collectively known as schemas 216). For example, the schemas 216-1 through 216-3 provide a corresponding persistency component 212-1 through 212-3 for the applications 204-1 through 204-3 via a corresponding database system interface 220-1 through 220-3. In one example embodiment, an application 204 may have its own schema 216-1, as illustrated in FIG. 2A. In this case, two applications 204 can have the same names for their database tables. This enables applications 204 that have been developed without a "global name service" to reserve table names. In addition, different runtimes may have different schemas 216.

In one example embodiment, functionality of an application 204 may be performed by the database system 228. For example, a join operation may be performed by the database system 228 and join views may be created using the tables of different applications 204 and/or different runtimes. Thus, join operations may be performed either by the database system 228 or, for example, via an HTTP call, as described above. In certain instances, the performance of the functionality of an application 204 by the database system 228 may require the access of the persistency component(s) 212 of another application 204. For example, the performance of the functionality of the application 204-2 by the database system 228 may require the access of the persistency components 212-1 of the application 204-1. The persistency components 212-1 of the application 204-1 may be accessed via application 204-2 and application 204-1, as indicated by arrow A in FIG. 2A.

Figure 2B:
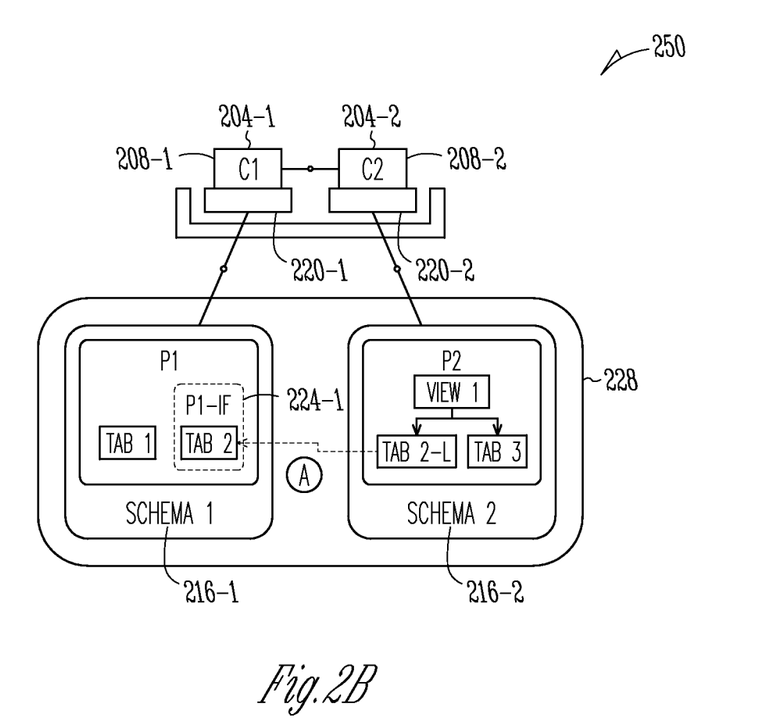
FIG. 2B is a block diagram of an example landscape environment comprising a plurality of applications, a database system, and a persistency interface, in accordance with an example embodiment.

FIG. 2B is a block diagram of an example landscape environment 250 comprising the applications 204-1, 204-2, the database system 228, and a persistency interface 224-1, in accordance with an example embodiment. The application 204-1 comprises the schema 216-1 that defines a first table (TAB 1) and a second table (TAB 2), and the persistency interface 224-1. In one example embodiment, the persistency interface 224-1 enables the application 204-2 or the functionality of the application 204-2 that is performed by the database system 228 to access Table 2 of the schema 216-1 without utilizing the software component 208-1 of the application 204-1. In the example of FIG. 2B, Table 2 of the schema 216-1 may be accessed via the persistency interface 224-1, as indicated by arrow A in FIG. 2B. The persistency interface 224-1 may provide read-only access or read-write access to Table 2 of the schema 216-1, as indicated by a role(s) defined by the application 204-1. For example, the role may grant the application 204-2 read-only access to Table 2 of the schema 216-1. The crossing from one schema 216 to another schema 216 is managed via a table link or synonym, as described more fully below. In one example embodiment, the name of a schema 216 is defined at design time or at deployment time.

The application 204-2 defines a first table (TAB 3) and a view (View 1). The application 204-2 also identifies the persistency interface 224-1 as an active interface and specifies a table link (TAB 2-L) that is a representation of Table 2 of the schema 216-1. View 1 provides access to the table TAB 3 for the application 204-2 and joins the table TAB 2 of the schema 216-1 of the application 204-1 via the table link TAB 2-L.

As used above, a table link (e.g., TAB 2-L) creates a level of abstraction from its corresponding table (i.e., table TAB 2 of schema 216-1) by acting as an updateable projection view. Operations on tables of foreign schemas (i.e., foreign tables) can thereby be performed in the local schema 216. The crossing from one schema 216 to another schema 216 is managed via the table link or synonym. In one example embodiment, changes to the schema 216 of a table do not change the definition of the persistency interface 224-1, thus allowing other software components to access the table via the persistency interface 224-1 without requiring revision or updating.

In one example embodiment, a user, a software component, and/or other entity needs to be explicitly granted permission to access persistency via the persistency interface 224-1. In one example embodiment, permission to access the persistency schema 216-1 via the persistency interface 224-1 is granted by defining a role for the user, the software component, and/or the other entity. For each persistency interface 224, a role may be defined. In addition, different persistency interfaces 224 can be defined for the same persistency component 212. The role may define which table(s) may be accessed, the type of access granted (such as read-only or read/write), and the like. In one example embodiment, access may be granted to only one or more specified portions of the table, such as access to only one or more specified fields and/or columns of the table. In one example embodiment, the database role is defined by the owner of the persistency component 212 that is to be accessed, is created in the target schema, and defines the source schema and objects to which access is provided. The owner of the persistency component 212 may be the corresponding application 204, the developer of the application 204, an administrator or user of the application 204, and the like. The role may be defined at design time or at run time. The roles may be delivered with the corresponding application 204 and may be created in the database system 228 upon deployment. In addition, different persistency interfaces 224 can be defined for the same persistency component 212. For example, a first persistency interface 224-1 may be defined with a role for a first user that grants read access to all fields of a table, a second persistency interface (not shown) may be defined with a role for an application 204 that grants read and write access to select fields of the table, and a third persistency interface (not shown) may be defined with a role for a second user that grants read and write access to one field of the table.

In one example embodiment, if an application 204 requires access and is a consumer of a foreign schema 216 of another application 204, the name of the other application 204 and the corresponding role needs to be specified as configuration data within the other application 204. Additionally, the synonyms and/or table links are defined in the other application 204. This definition uses a logical name for the foreign schema 216, which is replaced by the real schema name in the local schema 216. The table link or synonym names are defined by the consuming application 204 (not the names of the target application 204) to avoid naming collisions.

In the example of FIG. 2B, upon deployment of the application 204-2, access needs to be granted by assigning the role defined in the application 204-1 to the user of the application 204-2. Once access is granted, the table links in the schema 216-2 of the application 204-2 can be created. The database objects of the consuming application 204-2 (which consumes TAB 2-L) can then be created. The application 204-2 can be started and the user(s) of the application 204-2 have the right to read and/or write content from/to the table, as defined for the corresponding role.

As noted above, in one example embodiment, table access via the persistency interface 224-1 is performed using a table link that exposes the table to another schema 216, not by creating join views that use schema names. This enables a de-coupling of development and deployment. Schema naming does not need to be performed as part of the development effort and, therefore, schema names do not need to be known at development time. A table link specifies the list of fields (also known as a field select list) of the table that can be accessed by the corresponding role. As noted above, the table link can specify all fields of the table, or some of the fields of the table, such as one or more columns of the table. A table link can be consumed as an attribute view, a calculation view, and/or an analytical view. In addition, tables and other objects may be accessed via a synonym. In contrast to a table link and projection view, a synonym exposes all fields of a table. In addition, altering a table for which a synonym is defined will also alter the result sets of select operations executed on the synonym.

The definition of a field select list can serve to decouple the applications 204. If a table is changed after the persistency interface 224-1 and the corresponding field select list is defined, such as by adding additional columns or other fields, the new fields will not be automatically selected or recognized by the table link; the table link will operate correctly with the fields defined in the field select list. Thus, the persistency interface 224-1 is stable and continues to operate properly after changes to the table. In addition, if new fields are to be exposed via the persistency interface 224-1, the field select list may be updated with the new fields.

Figure 3:
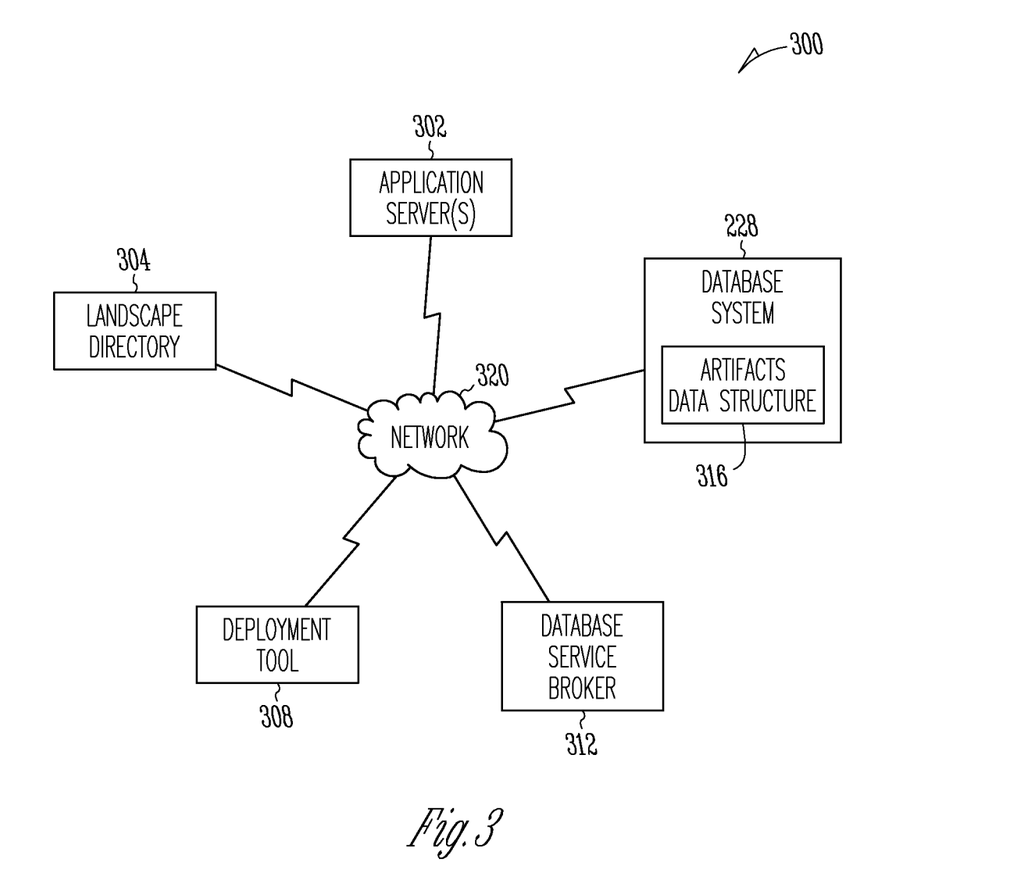
FIG. 3 is a block diagram of an example landscape for deploying applications, in accordance with an example embodiment.

FIG. 3 is a block diagram of an example landscape 300 for deploying applications 204, in accordance with an example embodiment. In one example embodiment, the landscape 300 comprises one or more application servers 302, a landscape directory 304, a deployment tool 308, a database service broker 312, the database system 228, an artifacts data structure 316, and a network 320. The artifacts in the artifacts data structure 316 include, for example, role metadata objects for the delivery of roles and the creation of tables, table links, and the like for the schemas 216. The network 320 may be a local area network (LAN), a wireless network, a metropolitan area network (MAN), a wide area network (WAN), a wireless network, a network of interconnected networks, the public switched telephone network (PSTN), and the like.

The landscape directory 304 stores the application instance, the application software version, the database instance, and the database schema being used by an application 204. The landscape directory 304 stores the application connectivity, including HTTP requests via, for example, a router, and stores the role based interface, the target application instance, the database schema and the role name. The landscape directory contains data sets for each deployed application identifying at which host, database name, and database schema the application maybe consumed. The landscape directory 304 also stores the application instance attributes, such as the test product, customer instance, application instance identifier, and the like. The landscape directory 304 stores the application URL and the secure store of the landscape directory 304 stores, for example, user names and their corresponding password(s). In one example embodiment, a landscape 300 in the landscape directory 304 that is associated with a particular customer may identify customer-specific (e.g., executing on customer-dedicated servers) and shared applications (e.g., executing on cloud-based servers) that the particular customer can access and use.

The deployment tool 308 orchestrates the activities of the application deployment and calls the database service broker 312 to create a schema 216 for an application 204 to deploy. The database service broker 312 calls the database system 228 to deploy the database artifacts and to create a schema 216 and database user(s). The database system 228 stores the application instance name, the database instance, and the database schema assigned to the application instance.

The database system 228 creates the schema(s) 216 and the database user(s). The database system 228 provides interfaces to create database objects and database roles, and to grant roles to database users.

Figure 4:
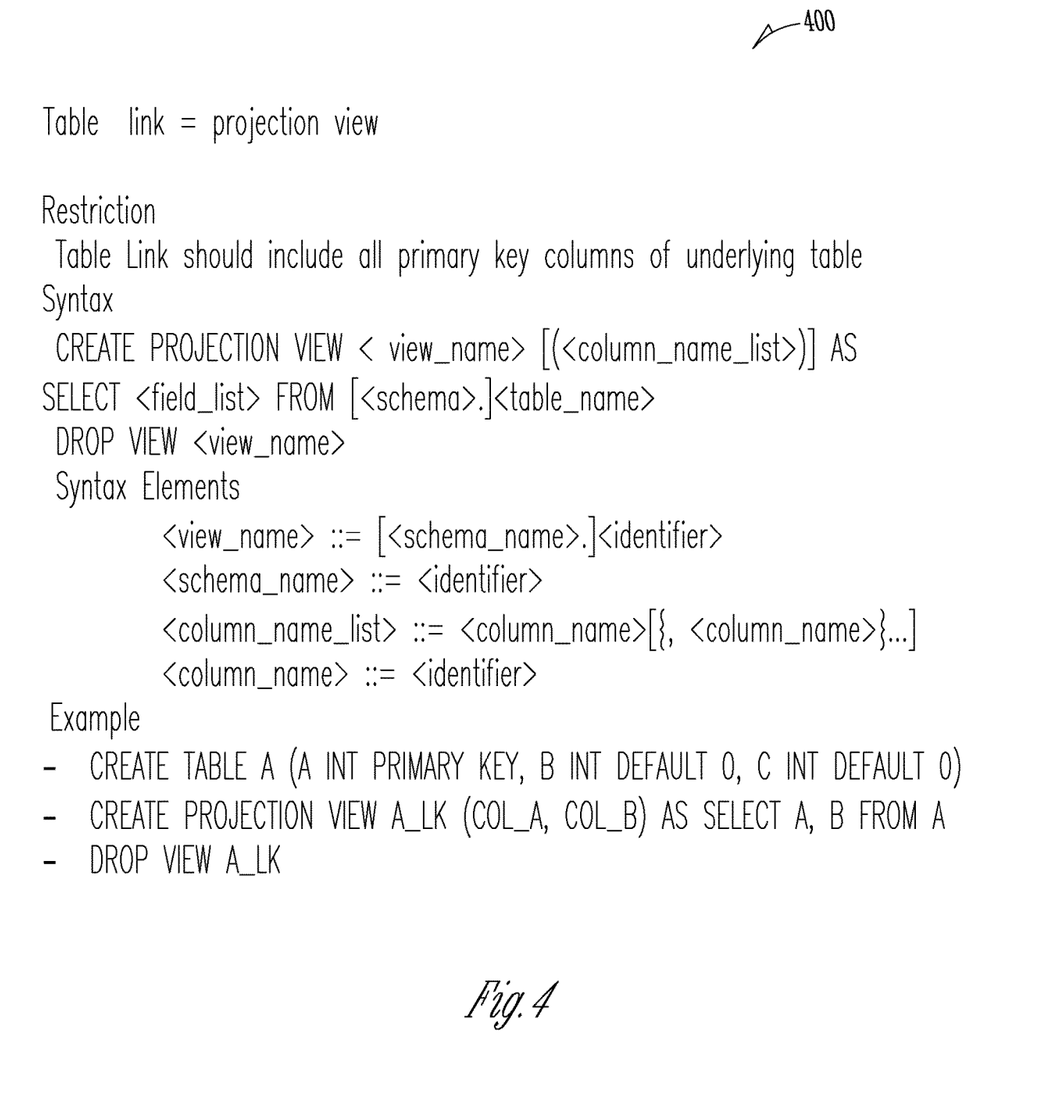
FIG. 4 is an example of a table link, in accordance with an example embodiment.

FIG. 4 is an example of a table link 400, in accordance with an example embodiment. In one example embodiment, the table link 400 is a projection view in the database system 228 and may include a restriction, such as a restriction that the table link 400 should include all primary key columns of the underlying table. The syntax includes a CREATE PROJECTION VIEW command that provides the name of the view, the select field list, and the table name; and the DROP VIEW command that provides the name of the view. The syntax elements include the view name (comprising the schema name and view identifier; a column name list); and the column name. The table link/projection view enable data to be inserted or updated via the projection view to the underlying table. In one example embodiment, the table link is "minimal" in the sense that it does not include joins and where clauses. The table link may be used by database objects like a table and, in one example embodiment, by all view types (e.g., calculation view, analytical view, and the like). In addition, database triggers can be defined for table links (as can be defined for database tables; not only instead-of triggers as for standard structured query language views).

Figure 5:
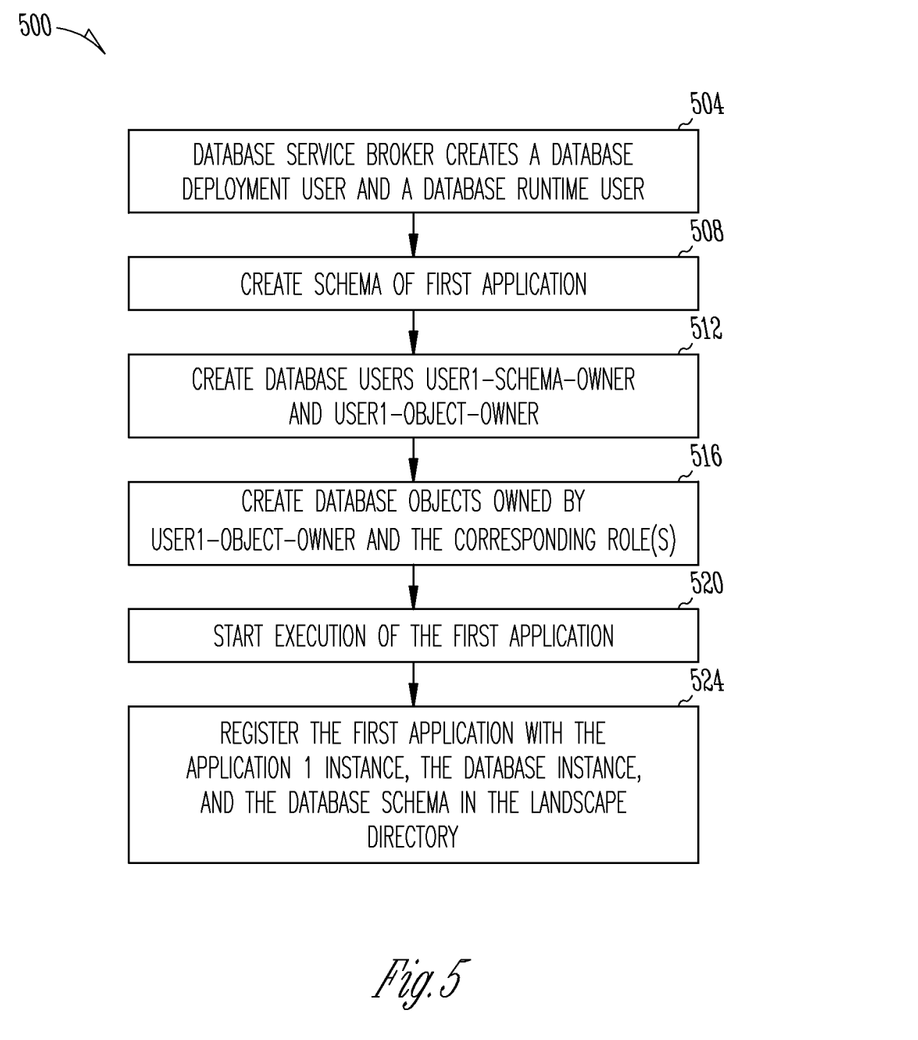
FIG. 5 is a flowchart of a first example method for deploying an application, in accordance with an example embodiment.

FIG. 5 is a flowchart of a first example method 500 for deploying the application 204-1, in accordance with an example embodiment. In one example embodiment, a database service broker creates a database deployment user (e.g., user1-deployment) and a database runtime user (e.g., user1-runtime) (operation 504). Schema 216-1 is created in the database system 228 (operation 508) and database users user1-schema-owner and user1-object-owner are created (operation 512). User1-schema-owner is the owner of the schema 216-1 for the application 204-1 and user1-object-owner is the owner of the objects (e.g., tables TAB 1 and TAB 2). User1-object-owner has permission to create database objects (and is triggered by user1-deployment); and user1-deployment has permission to trigger the creation of database objects via user1-object-owner. User1-runtime has permission to read from, write to, and call the database objects in schema 216-1, but may not change the structure of the database objects structure (i.e., no Data Definition Language (DDL) permission, only Data Manipulation Language (DML) permission). The database objects owned by user1-object-owner, such as tables TAB 1 and TAB 2, and the role p1-r-if (providing read-only access to the table TAB 2) are created (operation 516). Execution of the application 204-1 is started (operation 520). A deployment tool registers the application 204-1 with an application 1 instance, a database instance, and the schema 216-1 in the landscape directory 304 (operation 524).

During deployment planning, the administrator is notified that the application 204-2 requires an instance of application 204-1 for access to its persistency interface p1-r-if (with a specified version identifier). The administrator selects an application 204-1 instance from the landscape directory 304, which will be connected to the newly deployed application 204-2.

Figure 6:
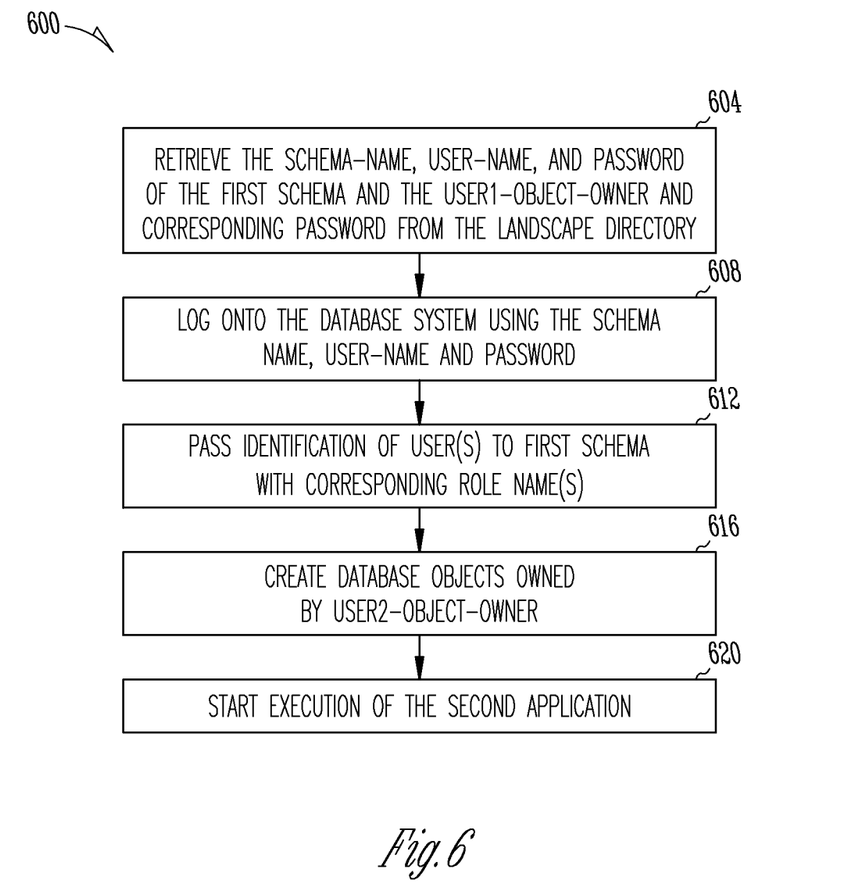
FIG. 6 is a flowchart of a second example method for deploying an application, in accordance with an example embodiment.

Similarly, during deployment of the application 204-2, the deployment tool accesses the database infrastructure through the database service broker and the database service broker creates a database user (e.g., user2-deployment) and a database user (e.g., user2-runtime). User user2-deployment has permission to trigger the creation of database objects via user2-object-owner and user2-object-owner has permission to create database objects (and is triggered by user2-deployment). User2-runtime has permission to read from, write to, and call the database objects in schema 216-2, but may not change the structure of the database objects structure (i.e., no DDL permission, only DML permission). Schema 216-2 is created in the database system 228 and a database user user2-schema-owner and a database user user2-object-owner are created.

FIG. 6 is a flowchart of a second example method 600 for deploying the application 204-2, in accordance with an example embodiment. The deployment tool retrieves the schema-name, user-name, and password of schema 216-1, and the user1-object-owner and its password from a secure store of the landscape directory 304 (operation 604). The deployment tool accesses the database system 228 and passes the schema-name, user-name and password to log on to the database system 228 (operation 608). The deployment tool calls, for example, "APP1-API.GRANT_ROLE_TO_USER" in schema 216-1 with user1-deployment-user and passes the identification of the new local users (to which the role shall be granted) together with the role name (operation 612). In one example embodiment, the new local users are, for example, schema2.user2-object-owner, schema2.user2-runtime, and schema1.p1-r-if. The database objects owned by user2-object-owner are created, including the table link (TAB 2-L) for table TAB 2 of schema 216-1, the table TAB 3, and the view View 1 (operation 616). The application 204-2 is started (operation 620). In one example embodiment, user2-runtime is used to read from and write to the database system 228. User2-runtime also has read access for table TAB 2 of schema 216-1, such that view1 can be used to query data. The deployment tool registers the application 204-2 with the application 204-1 instance, the database instance, and the database schema in the landscape directory 304.

Figure 7:
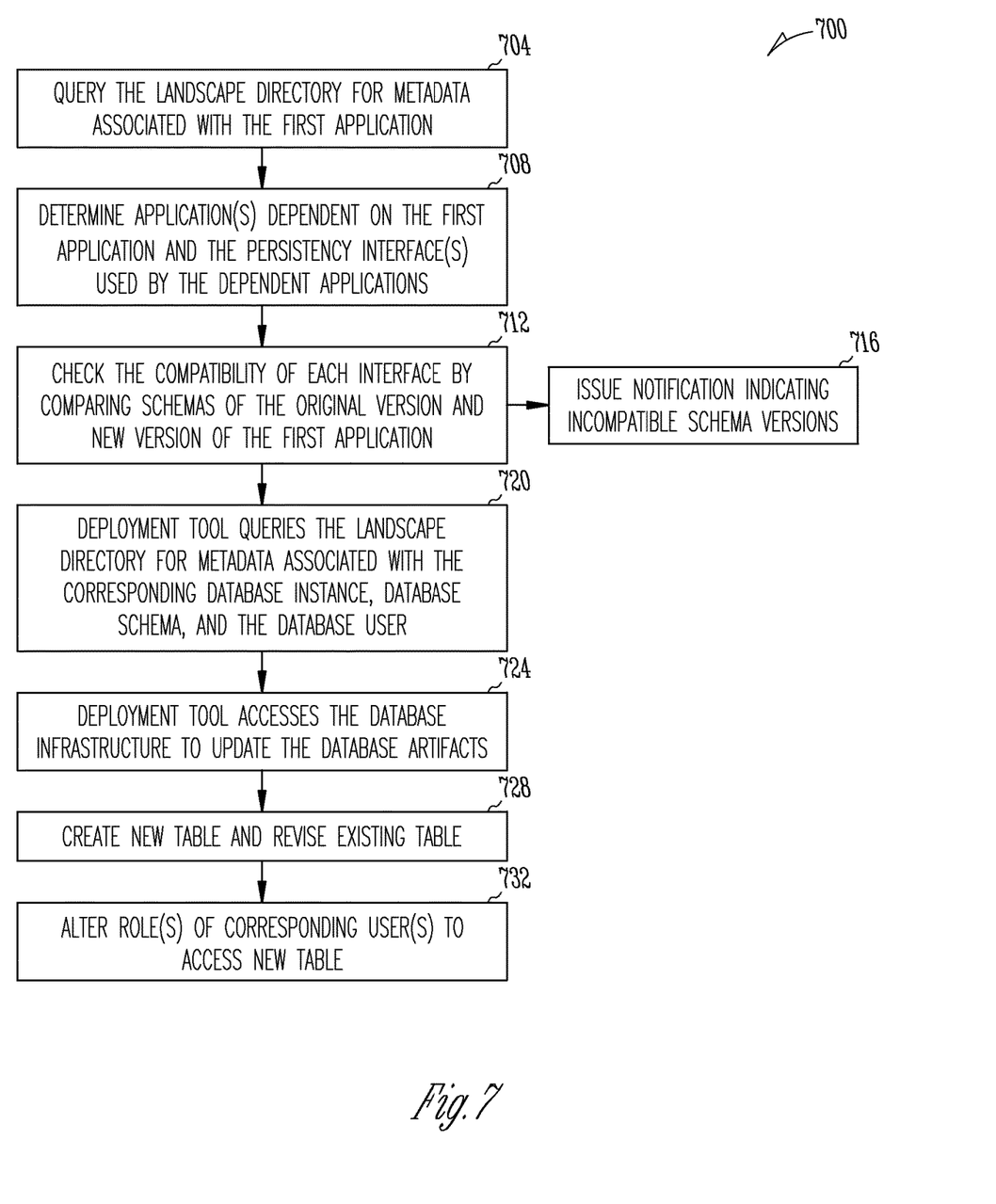
FIG. 7 is a flowchart of an example method for upgrading an application to a new version that is compatibly extended, in accordance with an example embodiment.

FIG. 7 is a flowchart of an example method 700 for upgrading the application 204-1 to a new version that is compatibly extended, in accordance with an example embodiment. In the example of FIG. 7, the new version of the application 204-1 has a new table and an existing table that has new fields in comparison to the original version of the application 204-1.

In one example embodiment, the landscape directory 304 is queried for metadata associated with the application 204-1 (operation 704). The query may be issued by, for example, a migration planning tool. The application(s) 204 dependent on the application 204-1 are determined and the persistency interfaces 224 used by the dependent application(s) are determined (operation 708). For example, a determination may be made that only the application 204-2 is dependent on the application 204-1 and that persistency interface 224-1 is used by the application 204-2. The compatibility of each persistency interface 224 is checked by comparing the schemas 216 of the original version of the application 204-1 and the new version of the application 204-1 (operation 712). In one example embodiment, if there are not fewer tables or database objects associated with the new version of the persistency interface 224 than the old version of the persistency interface 224, if there are no deleted fields in the table(s) associated with the new version of the persistency interface 224 (in comparison to the old version of the persistency interface 224), if there are no new restrictions of access rights associated with the new version of the persistency interface 224 (in comparison to the old version of the persistency interface 224), and if there are no changes to the field types of the table(s) associated with the new version of the persistency interface 224 (in comparison to the old version of the persistency interface), than the versions of the application 204-1 are compatible and the application 204-1 may be deployed.

If the versions of the application 204-1 are not compatible, a notification is issued indicating that the versions of the application 204-1 are not compatible (operation 716); otherwise, the deployment tool queries the landscape directory 304 for metadata associated with the corresponding database instance, database schema, and the database user (operation 720). The deployment tool 308 calls the database deployment infrastructure (i.e., the database system 228) to update the database artifacts in the artifacts data structure 316 (operations 724). The new table is created and the existing table is altered (operation 728). The role(s) of the corresponding entity(ies) are altered to enable access to the new table (operation 732). The method 700 then ends. The table link of the application 204-2 still only provides access to the fields of the table of the original version of the application 204-1 and the new table is not accessible via the persistency interface 224-1. The application 204-1 and the application 204-2 are compatible in terms of the persistency interface 224. If semantics of the fields of the table have changed, other mechanisms may be used to identify and address this issue. If a determination is made that the application 204-1 and the application 204-2 are incompatible, the application 204-2 may be upgraded to be compatible with the application 204-1, the table link(s) may be adjusted, and the objects using the table links may be re-created.

Figure 8:
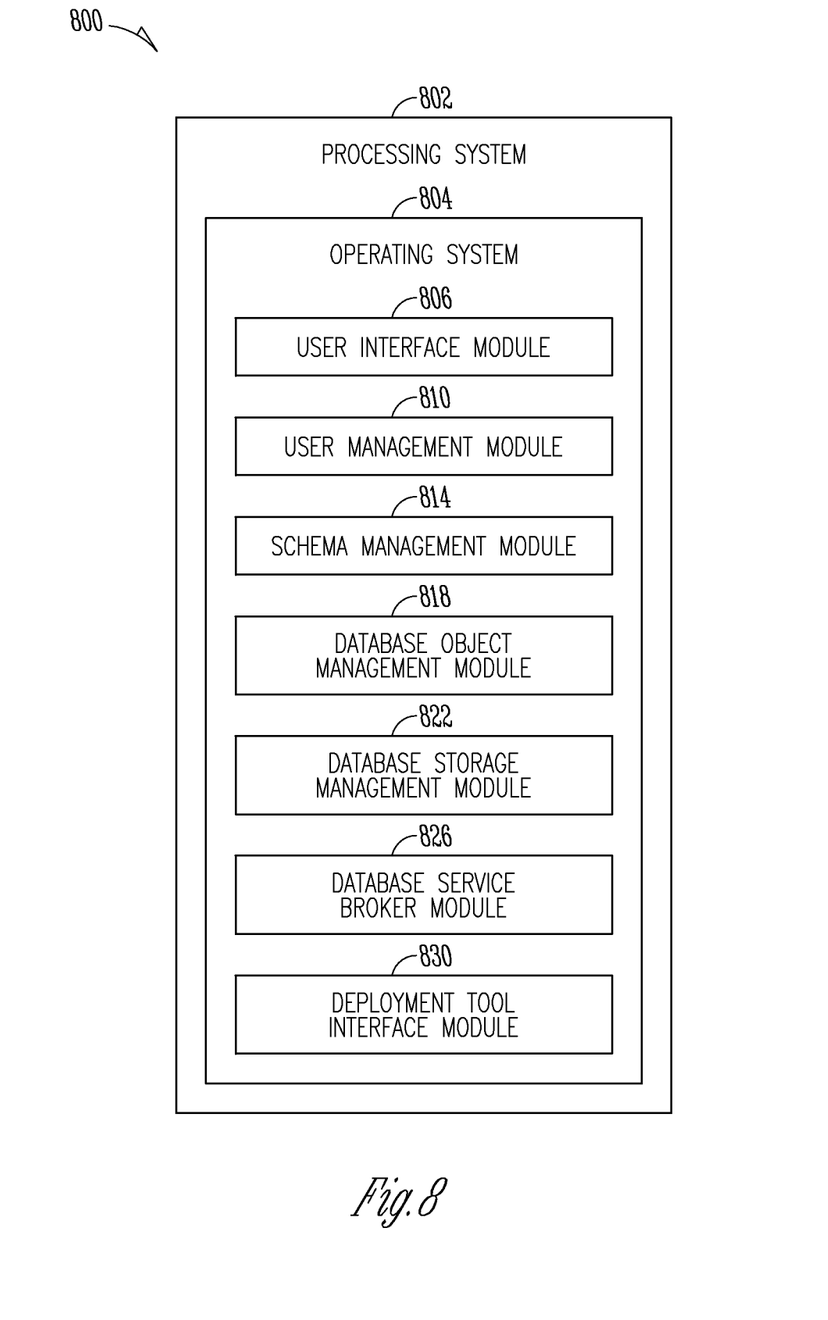
FIG. 8 is a block diagram of an example apparatus for a database system, in accordance an example embodiment.

FIG. 8 is a block diagram of an example apparatus 800 for a database system, in accordance an example embodiment. For example, the apparatus 800 may be used to implement the database system 228. The apparatus 800 is shown to include a processing system 802 that may be implemented on a server, client, or other processing device that includes an operating system 804 for executing software instructions. In accordance with an example embodiment, the apparatus 800 includes a user interface module 806, a user management module 810, a schema management module 814, a database object management module 818, a database storage management module 822, a database service broker module 826, and a deployment tool interface module 830.

The user interface module 806 enables a user, such as an administrator, developer, and the like, to define a persistency interface 224, as described above. The user management module 810 enables a user, such as an administrator, developer, and the like, to manage user accounts, such as users of the database system 228. The schema management module 814 manages the definition and deployment of schemas 216 in the database system 228.

The database object management module 818 manages the generation and maintenance of database objects in the database system 228. The database storage management module 822 provides an external interface to the database system 228. The database service broker module 826 creates database users, such as deployment users (e.g., user1-deployment) and runtime users (e.g., user1-runtime).

The deployment tool interface module 830 provides an interface between the database system 228 and the deployment tool. The deployment tool registers an application 204 with an application instance, a database instance, and a database schema in the landscape directory 304. The deployment tool retrieves the schema name, user-name, password of schema 216-1, and the user1-object-owner and its password from a secure store of the landscape directory 304. The deployment tool accesses the database system 228 and passes the schema name, user name, and password to log on to the database system 228. The deployment tool also calls a component of the schema 216-1 with user1-deployment-user and provides the identification of the new local users (to which the role shall be granted) together with the role name. The deployment tool 308 calls the database deployment infrastructure to update the database artifacts in the artifacts data structure 316.

Figure 9:
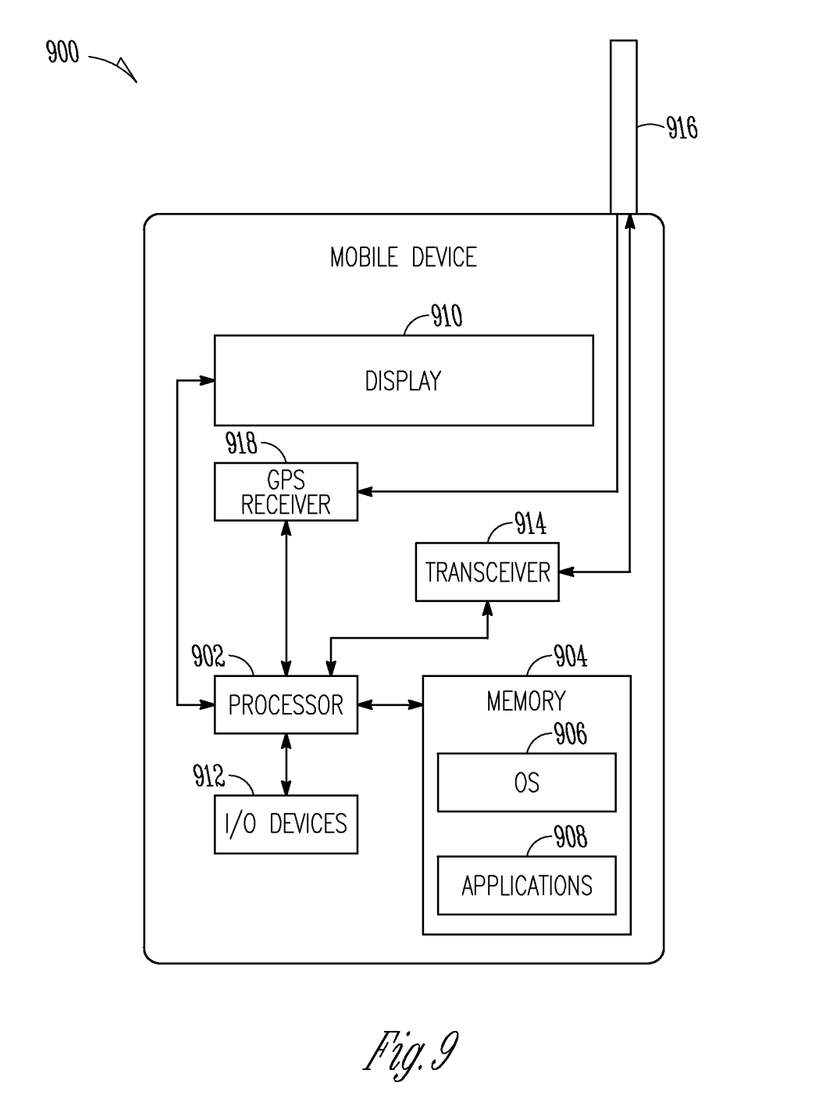
FIG. 9 is a block diagram illustrating a mobile device, according to an example embodiment.

FIG. 9 is a block diagram illustrating a mobile device 900, according to an example embodiment. The mobile device 900 can include a processor 902. The processor 902 can be any of a variety of different types of commercially available processors suitable for mobile devices 900 (for example, an XScale architecture microprocessor, a Microprocessor without Interlocked Pipeline Stages (MIPS) architecture processor, or another type of processor). A memory 904, such as a random access memory (RAM), a Flash memory, or other type of memory, is typically accessible to the processor 902. The memory 904 can be adapted to store an operating system (OS) 906, as well as applications 908, such as a mobile location enabled application that can provide location-based services (LBSs) to a user. The processor 902 can be coupled, either directly or via appropriate intermediary hardware, to a display 910 and to one or more input/output (I/O) devices 912, such as a keypad, a touch panel sensor, and a microphone. Similarly, in some embodiments, the processor 902 can be coupled to a transceiver 914 that interfaces with an antenna 916. The transceiver 914 can be configured to both transmit and receive cellular network signals, wireless data signals, or other types of signals via the antenna 916, depending on the nature of the mobile device 900. Further, in some configurations, a GPS receiver 918 can also make use of the antenna 916 to receive GPS signals.

Figure 10:
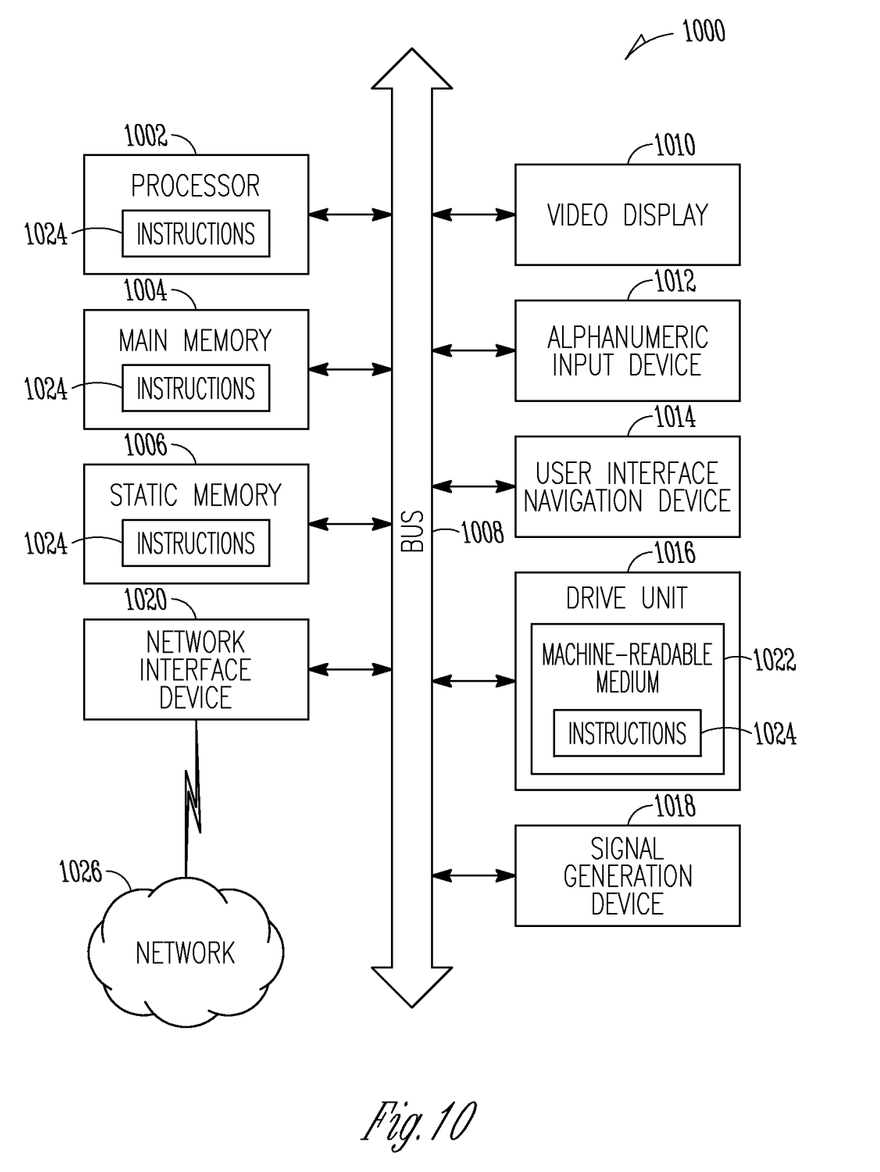
FIG. 10 is a block diagram of a computer processing system within which a set of instructions may be executed for causing a computer to perform any one or more of the methodologies discussed herein.

FIG. 10 is a block diagram of a computer processing system 1000 within which a set of instructions 1024 may be executed for causing a computer to perform any one or more of the methodologies discussed herein. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment.

In addition to being sold or licensed via traditional channels, embodiments may also, for example, be deployed by software-as-a-service (SaaS), application service provider (ASP), or by utility computing providers. The computer may be a server computer, a personal computer (PC), a tablet PC, a set-top box (STB), a personal digital assistant (PDA), a cellular telephone, or any processing device capable of executing a set of instructions (sequential or otherwise) that specify actions to be taken by that device. Further, while only a single computer is illustrated, the term "computer" shall also be taken to include any collection of computers that, individually or jointly, execute a set (or multiple sets) of instructions to perform any one or more of the methodologies discussed herein.

The example computer processing system 1000 includes a processor 1002 (e.g., a central processing unit (CPU), a graphics processing unit (GPU), or both), a main memory 1004, and a static memory 1006, which communicate with each other via a bus 1008. The computer processing system 1000 may further include a video display 1010 (e.g., a plasma display, a liquid crystal display (LCD), or a cathode ray tube (CRT)). The computer processing system 1000 also includes an alphanumeric input device 1012 (e.g., a keyboard), a user interface (UI) navigation device 1014 (e.g., a mouse and/or touch screen), a drive unit 1016, a signal generation device 1018 (e.g., a speaker), and a network interface device 1020.

The drive unit 1016 includes a machine-readable medium 1022 on which is stored one or more sets of instructions 1024 and data structures embodying or utilized by any one or more of the methodologies or functions described herein. The instructions 1024 may also reside, completely or at least partially, within the main memory 1004, the static memory 1006, and/or within the processor 1002 during execution thereof by the computer processing system 1000, the main memory 1004, the static memory 1006, and the processor 1002 also constituting tangible machine-readable media 1022.

The instructions 1024 may further be transmitted or received over a network 1026 via the network interface device 1020 utilizing any one of a number of well-known transfer protocols (e.g., Hypertext Transfer Protocol).

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions 1024. The term "machine-readable medium" shall also be taken to include any medium that is capable of storing, encoding, or carrying a set of instructions 1024 for execution by the computer and that cause the computer to perform any one or more of the methodologies of the present application, or that is capable of storing, encoding, or carrying data structures utilized by or associated with such a set of instructions 1024. The term "machine-readable medium" shall accordingly be taken to include, but not be limited to, solid-state memories and optical and magnetic media.

While the embodiments of the invention(s) is (are) described with reference to various implementations and exploitations, it will be understood that these embodiments are illustrative and that the scope of the invention(s) is not limited to them. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A computerized method for facilitating access in a database system, the database system comprising a first schema providing a first persistency component for a first application and a second schema providing a second persistency component for a second application, the computerized method comprising:
    generating a first persistency interface in the database system, the first persistency interface comprising a first table link, the first table link comprising an updatable projection view of a first table of the first schema in the second schema, the database system comprising one or more hardware processors and one or more hardware data structures;
    receiving, from the first application, a role for the first persistency interface, the role for first the first persistency interface describing a type of access to the first table for the second application via the first table link for a first user;
    generating a second persistency interface in the database system, the second persistency interface comprising a second table link, the second table link comprising an updateable projection view of the first table of the first schema in the second schema;
    receiving, from the first application, a role for the second persistency interface, the role for the second persistency interface describing a type of access to the first table for the second application via the second table link for a second user, wherein the type of access for the first table for the second application via the second table link is different than the type of access to the first table for the second application via the first table link;
    receiving, by the database system, a request from the second application to perform an operation on the updatable projection view of the first table for the first user; and
    responsive to the request, executing the operation on the first table at the first schema using the first table link.

2. The computerized method of claim 1, wherein the role for the first persistency interface is created in the first schema and identifies the first schema.

3. The computerized method of claim 1, wherein a name of the first table link is defined by a consuming application of the first table.

4. The computerized method of claim 1, wherein the first table link specifies one or more fields of the first table that are authorized for access by the role for the first Persistency interface.

5. The computerized method of claim 1, wherein the database system performs functionality of an application on behalf of the application using the first persistency interface to access the first table.

6. The computerized method of claim 1, wherein a synonym provides access by a schema of a consuming application to the first table.

7. The computerized method of claim 1, wherein the first table link provides access by a schema of a consuming application to the first table.

8. The computerized method of claim 1, further comprising:
    receiving, by the database system, a request from the second application to perform an operation on the updatable projection view of the first table for the second user; and
    responsive to the request, executing the operation on the first table at the first schema using the second table link.

9. An apparatus for providing facilitating access in a database system, the database system comprising a first schema providing a first persistency component for a first application and a second schema providing a second persistency component for a second application, the apparatus comprising:
    one or more processors;
    memory to store instructions that, when executed by the one or more processors, cause the one or more processors to perform operations comprising:
        generating a first persistency interface, the first persistency interface comprising a first table link, the first table link comprising an updatable projection view of a first table of the first schema in the second schema;
        receiving, from the first application, a role for the first persistency interface, the role for the first persistency interface describing a type of access to the first table for the second application via the first table link for a first user;
        generating a second persistency interface in the database system, the second persistency interface comprising a second table link, the second table link comprising an updateable projection view of the first table of the first schema in the second schema;
        receiving, from the first application, a role for the second persistency interface, the role for the second persistency interface describing a type of access to the first table for the second application via the second table link for a second user, wherein the type of access for the first table for the second application via the second table link is different than the type of access to the first table for the second application via the first table link;
        receiving, by the database system, a request from the second application to perform an operation on the updatable projection view of the first table for the first user; and
        responsive to the request, executing the operation on the first table at the first schema using the first table link.

10. The apparatus of claim 9, wherein the role for the first persistency interface is created in the first schema and identifies the first schema.

11. The apparatus of claim 9, wherein a name of the first table link is defined by a consuming application of the first table.

12. The apparatus of claim 9, wherein the first table link specifies one or more fields at the first table that are authorized for access by the role for the first persistency interface.

13. The apparatus of claim 9, wherein a database system performs functionality of an application on behalf of the application using the first persistency interface to access the first table.

14. The apparatus of claim 9, wherein a synonym provides access by a schema of a consuming application to the first table of the first schema.

15. The apparatus of claim 9, wherein the first table link provides access by a schema of a consuming application to the first table.

16. The apparatus of claim 9, wherein the operations further comprising:
   receiving, by the database system, a request from the second application to perform an operation on the updatable projection view of the first table for the second user; and
   responsive to the request, executing the operation on the first table at the first schema using the second table link.

17. A non-transitory computer-readable medium embodying instructions that, when executed by a processor, perform operations comprising:
   generating first a persistency interface, the first persistency interface comprising a first table link, the first table link comprising an updatable projection view of a first table of a first schema in a second schema, the first schema providing a first persistency component for a first application and the second schema providing a second persistency component for a second application; and
   receiving, from the first application, a role for the first persistency interface, the role defining a type of access to the first table for the second application via the first table link for a first user;
   generating a second persistency interface in the second persistency interface comprising a second table link, the second table link comprising an updateable projection view of the first table of the first schema in the second schema;
   receiving, from the first application, a role for the second persistency interface, the role for the second persistency interface describing a type of access to the first table for the second application via the second table link for a second user, wherein the type of access for the first table for the second application via the second table link is different than the type of access to the first table for the second application via the first table link;
   receiving a request from a second application to perform an operation on updatable projection view of the first table for the first user; and
   responsive to the request, executing the operation on the first table at the first schema using the first table link.

18. The computer-readable medium of claim 17, wherein the first table link specifies one or more fields of the first table that are authorized for access by the role for the first persistency interface.

19. The computer-readable medium of claim 17, wherein a database system performs functionality of an application on behalf of the application using the first persistency interface to access the first table.

20. The computer-readable medium of claim 17, wherein a synonym provides access by a schema of a consuming application to the first table.

* * * * *